United States Patent
Kuruvilla et al.

(10) Patent No.: US 11,214,354 B2
(45) Date of Patent: Jan. 4, 2022

(54) CONTROL SURFACE ACTUATION MECHANISM

(71) Applicant: AIRBUS SAS, Blagnac (FR)

(72) Inventors: Jason Kuruvilla, Bristol (GB); Pradeep Gajakosh, Bristol (GB); Akshay Srinivasamurthy, Bristol (GB); Rakshith Raghavan Belur, Bristol (GB); Sumit Kumar Malik, Bristol (GB); Gayathri Swaminathan, Bristol (GB); Vinayak Ramachandra Patil, Bristol (GB); Avinash Kumar Yadav, Bristol (GB)

(73) Assignee: AIRBUS SAS, Blagnac (FR)

(*) Notice: Subject to any disclaimer, the term of this patent is extended or adjusted under 35 U.S.C. 154(b) by 441 days.

(21) Appl. No.: 16/389,210

(22) Filed: Apr. 19, 2019

(65) Prior Publication Data

US 2019/0329865 A1 Oct. 31, 2019

(30) Foreign Application Priority Data

Apr. 27, 2018 (IN) .............................. 201811015978

(51) Int. Cl.
 *B64C 9/02* (2006.01)
 *B64C 9/04* (2006.01)
 *B64C 3/18* (2006.01)
(52) U.S. Cl.
 CPC ................ *B64C 9/02* (2013.01); *B64C 3/185* (2013.01); *B64C 3/187* (2013.01); *B64C 9/04* (2013.01)

(58) Field of Classification Search
 CPC .. B64C 9/02; B64C 9/04; B64C 3/185; B64C 3/187
 See application file for complete search history.

(56) References Cited

U.S. PATENT DOCUMENTS

| 2,202,430 | A | 5/1940 | Rebeski |
| 2,791,385 | A | 5/1957 | Johnson |
| 3,568,957 | A | 3/1971 | Wood |

(Continued)

FOREIGN PATENT DOCUMENTS

| CH | 699 847 | 5/2010 |
| CN | 104691740 | 6/2015 |
| EP | 3378759 | 9/2018 |

OTHER PUBLICATIONS

European Search Report for European Application No. 19170461.8, nine pages, dated Sep. 26, 2019.

(Continued)

*Primary Examiner* — Marc Burgess
(74) *Attorney, Agent, or Firm* — Nixon & Vanderhye P.C.

(57) ABSTRACT

A control surface actuation mechanism for moving a control surface relative to a fixed aerofoil portion of an aircraft is disclosed including an articulating support, a sliding member on the articulating support and coupled to the control surface, the sliding member arranged to slide relative to the articulating support, a track with a path for attachment on the fixed aerofoil portion, and a rigid connecting element connected to the first track and to the sliding member. The first end of the first rigid connecting element is configured to move passively along the path, as the sliding member is driven to slide relative to the articulating support by an actuator.

15 Claims, 4 Drawing Sheets

(56) References Cited

U.S. PATENT DOCUMENTS

| | | | | |
|---|---|---|---|---|
| 3,778,009 | A * | 12/1973 | Jones | B64C 9/20 |
| | | | | 244/216 |
| 4,470,569 | A * | 9/1984 | Shaffer | B64C 9/22 |
| | | | | 244/213 |
| 6,010,097 | A * | 1/2000 | Cox | B64C 9/16 |
| | | | | 244/216 |
| 2011/0253832 | A1 * | 10/2011 | Wildman | B64C 9/22 |
| | | | | 244/99.13 |
| 2019/0359314 | A1 * | 11/2019 | Tsai | B64C 9/10 |

OTHER PUBLICATIONS

Combined Search and Examination Report for GB1809210.6 dated Nov. 30, 2018, 5 pages.
Schoensleben, Sven "Integrated Trailing Edge Flap Track Mechanism for Commercial Aircraft" Master Thesis, Winter Term Jun. 2005 at the Center of Structure Technologies, Prof. Dr. Paolo Ermanni, 207 pages, (2006).

\* cited by examiner

CONTROL SURFACE ACTUATION MECHANISM

CROSS RELATED APPLICATION

This application claims priority to Indian (IN) patent application 201811015978, filed Apr. 27, 2018, the entire contents of which are hereby incorporated by reference.

FIELD OF THE INVENTION

The present invention relates to a control surface actuation mechanism for moving a control surface relative to a fixed aerofoil portion of an aircraft.

BACKGROUND OF THE INVENTION

Control surface actuation mechanisms can use multiple cams in order to achieve the various deflections of the control surface needed. These mechanisms can be complex, heavy, require long manufacturing lead times, and increase drag by extending into the airflow.

SUMMARY OF THE INVENTION

According to an aspect of the invention, there is provided a control surface actuation mechanism for moving a control surface relative to a fixed aerofoil portion of an aircraft, comprising: an articulating support for pivotal coupling to the fixed aerofoil portion about a generally spanwise pivot axis, a sliding member having a proximal end mounted on the articulating support, and having a distal end for coupling to the control surface, the sliding member arranged to slide relative to the articulating support along a generally chordwise axis, a first track for attachment on the fixed aerofoil portion and defining a first path, and a first rigid connecting element connected at a first end to the first track and connected at a second end to the sliding member, wherein the first end of the first rigid connecting element is configured to move passively along the first path, as the sliding member is driven to slide relative to the articulating support by an actuator.

A further aspect of the invention provides an aerofoil of an aircraft including a fixed aerofoil portion, a control surface, and the actuation mechanism of the first aspect.

The invention is advantageous in that translation and/or rotation of the control surface can be controlled more simply with fewer parts than previously. Driving the sliding member relative to the articulating support causes translation of the control surface, whilst the path of the track can cause rotation of the control surface by rotating the articulating support using the rigid connecting element. The path of the track can be tailored to give a particular control surface response, such that the degree of translation and rotation of the control surface can be controlled at all stages of deployment.

Here the term 'generally spanwise' refers to a direction approximately in the spanwise direction, within a small angle of difference.

Here the term 'generally chordwise' refers to a direction approximately in the chordwise direction, within a small angle of difference.

The term 'rigid connecting element' is used here to refer to a connecting element with a fixed length, i.e. it is substantially inextensible.

The first rigid connecting element may be pivotally connected at the first end to the first track. Although the first rigid connecting element can move along the first track it may also pivot relative to the first track at any point along the first track. This may assist the first end of the first rigid connecting element to move along the track when the path of the track has a non-linear portion so the angle of the first rigid connecting element relative to the local path of the track can vary.

The first rigid connecting element may be pivotally connected at the second end to the sliding member.

The first path may have a non-linear portion.

The non-linear portion of the first path may allow the relative rate of translation of the sliding member and rotation of the articulating support to be altered as the sliding member moves. This can then alter the degree of translation and rotation of the control surface at different phases/states of control surface deployment.

The articulating support may be configured to rotate about the spanwise pivot axis in response to movement of the first end of the first rigid connecting element along the first track.

This may provide passive rotation of the articulating support determined by the path of the first track so that both rotation and translation of the control surface at any phase/state of deployment can be predetermined by the position of the first end of the first rigid connecting element along the path of the first track.

The control surface may translate relative to the articulating support as the slider translates.

This may allow the control surface to be translated relative to the fixed aerofoil portion of the aircraft in order to change the aerodynamic profile of the wing.

The control surface actuation mechanism may include a second rigid connecting element that may be connected at a first end to the sliding member and may be connected at a second end to a second track defining a second path, wherein the second end of the second rigid connecting element may be configured to move along the second path.

The control surface actuation mechanism may include a third rigid connecting element, wherein the third rigid connecting element causes rotation of the control surface with respect to the articulating support.

This may provide additional rotation of the control surface with respect to that provided by the first track and articulating support, in order to achieve larger deflections.

A second end of the third rigid connecting element may be coincident with the second end of the second rigid connecting element.

Both the second and third rigid connecting elements may be driven from this coincident point between the two rigid connecting elements.

The third rigid connecting element may be connected to a third track that defines a third path.

The third rigid connecting element that causes rotation of the control surface relative to the articulating support may have its movement altered dependent on the path of the third track.

A first end of the third rigid connecting element may be connected to a second sliding member having a proximal end mounted on the articulating support, and having a distal end for coupling to the control surface, the sliding member may be arranged to slide relative to the articulating support along a generally chordwise axis.

The relative positions of the two sliding members may provide additional control to the control surface actuation.

The articulating support may provide an aerodynamic outer surface of the aerofoil.

This has the advantage that the articulating support can form a moveable aerodynamic surface that compliments the deployment of the control surfaces and reduces drag.

The fixed aerofoil portion may have a rear spar and an aft rib, and the first track may be on the aft rib.

Here the term 'spar' is used to refer to any primary load bearing structure extending generally spanwise along an aerofoil. Here the term 'rib' is used to refer to a generally chordwise extending structural member of an aerofoil. Aft refers to a location towards the rear or tail of an aircraft, such that an aft rib is a rib generally closer to the tail of the aircraft.

The actuator may be a linear actuator. The linear actuator may be arranged to have an output that moves parallel to the rear spar. Alternatively, a rotary or any other actuator type suitable for driving the articulating mechanism may be used.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
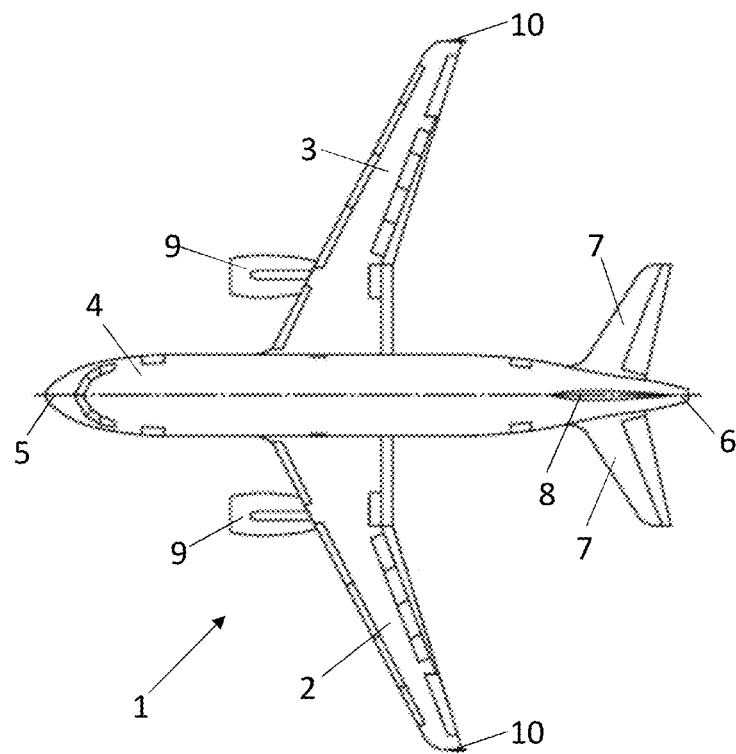
FIG. 1 is a plan view of an aircraft.

FIG. 1 illustrates a typical fixed wing aircraft 1 having a port wing 2 and starboard wing 3 carrying wing mounted engines 9, the wings 2, 3 extending from a fuselage 4. The fuselage has a nose 5 and a tail 6 with horizontal and vertical stabiliser surfaces 7, 8 near the tail 6. The tips of the wings include wing tip devices 10. The aircraft 1 is a typical jet passenger transport aircraft but the invention is applicable to a wide variety of fixed wing aircraft types, including commercial, military, passenger, cargo, jet, propeller, general aviation, etc. with any number of engines attached to the wings or fuselage.

Figure 2:
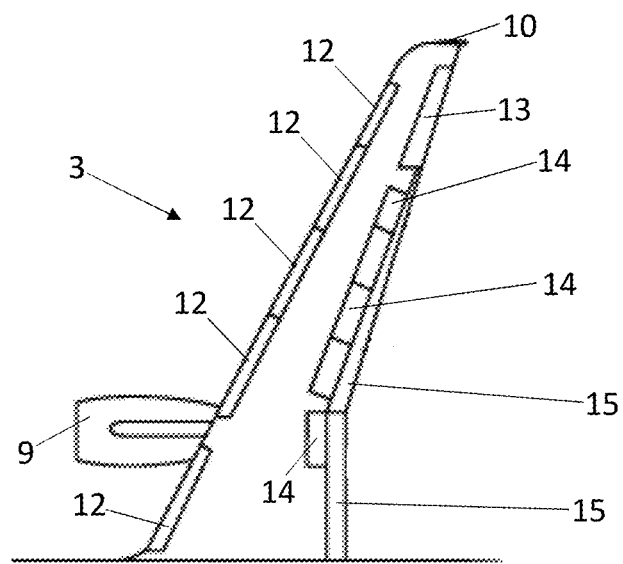
FIG. 2 is a plan view of a starboard aircraft wing.

Each wing 2, 3 of the aircraft 1 has a cantilevered structure with a length extending in a span-wise direction from a root to a tip, the root being joined to the aircraft fuselage 4. The wings 2, 3 are similar in construction so only the starboard wing 3 will be described in detail with reference to FIG. 2.

The wing 3 has a number of flight control surfaces. Adjacent to the leading edge of the wing 3 are slats 12 distributed along the span of the wing 3, an aileron 13 is provided on an outboard section of the trailing edge of the wing, and air brakes/spoilers 14 are provided across the upper surface of the wing 3 towards the trailing edge.

The trailing edge of the wing 3 has an inner flap 15 adjacent to the wing root, and an outer flap 15 outboard of the inner flap towards the aileron 13. Notably the flaps 15 preferably do not have associated flap track fairings on the underside of the wing 3 due to the flap actuation mechanism which will be described in detail below. This improves the aerodynamic performance of the aircraft.

Whilst the aircraft 1 is shown with a particular quantity and configuration of control surfaces, it will be understood that the wings 2, 3 may comprise a different number and/or arrangement of control surfaces.

The control surface actuation mechanism that is shown in detail in FIGS. 3-5. The mechanism is particularly suitable as an actuation mechanism for a flap, however it will be understood that the mechanism may be suitable for a different control surface such as an aileron, flaperon, spoiler, elevator or slat, or other control surface, of an aircraft.

Figure 3A:
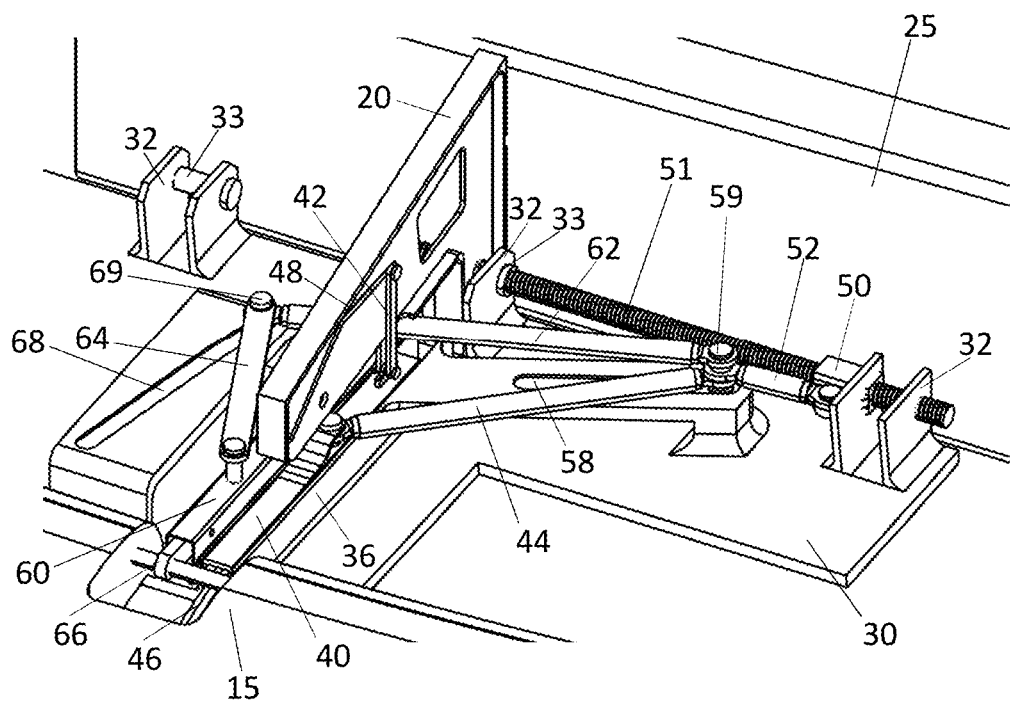
FIG. 3a shows an perspective view of the control surface actuation mechanism in the non-deployed, or retracted, state.
Figure 3B:
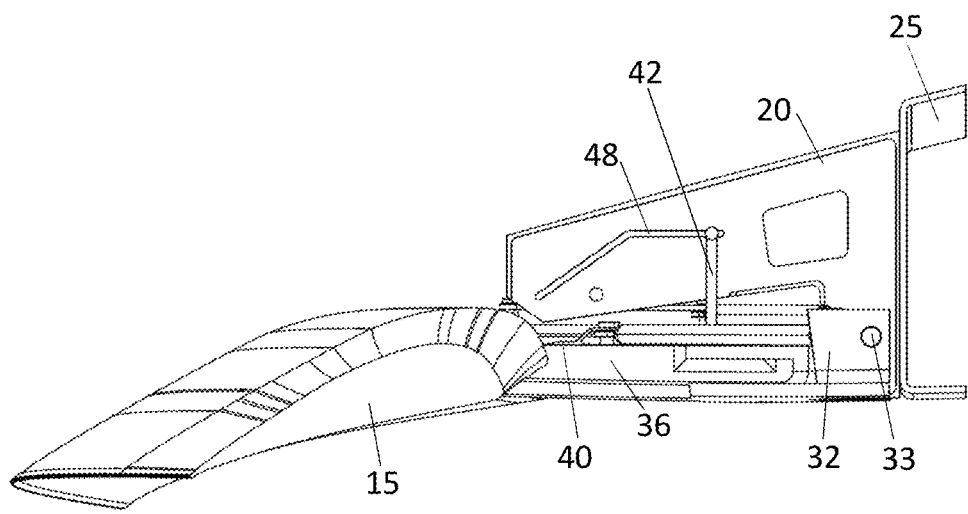
FIG. 3b shows a side view of the control surface actuation mechanism in the non-deployed, or retracted, state.

In FIGS. 3a-b, the movable flight control surface 15 is shown in the neutral position, that is to say it is retracted and has not been actuated to a deployed position and is in its zero degree position.

The mechanism includes an articulating support 30 attached to three aft ribs 20 by a pivot joint (only the central aft rib 20 is shown), wherein the aft ribs 20 are attached to a rear spar 25, and form part of a fixed aerofoil portion of the wing 3. The pivot joint includes a hinge bracket 32 attached to the articulating support 30, and a hinge bar or pin 33 that fits in a hole in the aft ribs 20 so that the articulating support 30 is able to rotate with respect to the fixed aerofoil portion. The hinge bar 33 on the central aft rib 20 is shown to be hollow so that the drive shaft 51 of a linear actuator 50 can fit inside the hinge bar 33.

A sliding member 40 is configured to slide on the articulating support 30. The articulating support 30 includes a channel 36 that guides the sliding member 40 in a generally chordwise direction. The sliding member 40 is attached at one end to the control surface 15 using a rigid control link 46. The interconnection between the control surface 15, articulating support 30, and sliding member 40, means that any translation of the sliding member 40 results in a translation of the control surface, and any rotation of the articulating support 30 results in a rotation of the control surface 15, with respect to the fixed aerofoil portion.

A rigid connecting element 42 connects the sliding member 40 to a track 48 on the central aft rib 20. A first end of the rigid connecting element 42 engages the track 48 and is able to move along the track 48. A second end of the rigid connecting element 42 connects to the sliding member 40 at a fixed point on the sliding member 40.

The first end of the rigid connecting element 42 is configured to pivot about the track 48 and so that it can move (translate) along the track 48.

The sliding member 40 is driven by an actuator 50, the actuator 50 being attached to the sliding member 40 via a second rigid connecting element 44 and a rigid actuator link 52. The second rigid connecting element 44 is connected at a first end to the sliding member 40, and connects at a second end to a follower 59 that engages a second track 58. The first end of the rigid actuator link 52 is also coupled to the follower 59 so that it is coincident with the second end of the second rigid connecting element 44. The rigid actuator link 52 is directly connected to the actuator 50.

A second sliding member 60 is adjacent to the first sliding member 40 and configured to slide parallel to the first sliding member 40 on the articulating support 30. The second sliding member 60 is attached at one end to the control surface 15 using a second rigid control link 66. The second sliding member 60 moves in a second channel (not shown) on the articulating support 30, so that the second sliding member 60 moves in a generally chordwise direction with respect to the articulating support 30.

The second sliding member 60 is driven by the actuator 50 through a third rigid connecting element 62, a rigid track link 64, and the actuator link 52. The second sliding member 60 is attached to the first end of the rigid track link 64, with the second end of the rigid track link 64 connected to a second follower 69. The second follower 69 engages a third track 68, and also forms a coupling between the second end of the rigid track link 64 and the first end of the third rigid connecting element 62. The second end of the third rigid connecting element 62 is coupled to the first follower 59 on the second track 58, and is therefore coincident with the first end of the connector 52 and the second end of the second rigid connecting element 44.

The first control link 46 that attaches the first sliding member 40 to the control surface 15, and the second control link 66 that attaches the second sliding member 60 to the control surface 15, both attach to the control surface 15 at different chordwise locations of the control surface so that translation of one sliding control link 46, 66 with respect to the other causes a rotation of the control surface 15 with respect to both the fixed aerofoil portion and with respect to the articulating support 30. In this embodiment the second control link is attached proximate the control surface leading edge, and the first control link is attached to the control surface 15 aft of the connection of the second control link 66 towards the control surface mid-chord position, although it will be clear that they may be arranged differently so that, for example, the second control link 66 is attached to the control surface 15 aft of the first control link 46.

The actuation of the control surface using the actuation mechanism will now be described with reference to FIGS. 3-5.

The actuator 50 is shown in FIG. 3 in a first position that corresponds to its minimum deployment state, so that the movable flight control surface 15 is shown in its zero degree or neutral position. When the actuator 50 is activated, it can travel along the drive shaft 51 towards a second position shown in FIGS. 4a-b.

As the actuator 50 moves towards this second position, the actuator 50 drives the first follower 59 along the second track 58, causing the first and second sliding members 40, 60 to translate relative to the articulating support 30.

The first sliding member 40 is connected to the second track 58 by the second rigid connecting element 44, so that the translation of the first sliding member 40 is determined by the path of the second track 58.

The second sliding member 60 is connected to the second track 58 via the third track 68, so that the second sliding member 60 is able to translate with respect to the first sliding member 40. The difference in translation between the first and second sliding members 40, 60 is determined by the path of the third track 68.

This difference in translation between the first sliding member 40 and the second sliding member 60 causes a rotation of the control surface 15 with respect to the articulating support 30 due to the resultant moment arm of the two control links 46, 66 attached to the control surface 15 at different chordwise positions.

As the first sliding member 40 translates, the first end of the first rigid connecting element 42 is passively moved along the first track 48. The section of the first track 48 between the first and second positions of the first end of the first rigid connecting element, shown in FIGS. 3 and 4 respectively, is linear and parallel to the articulating support 30, so that there is no reactive force between the first rigid connecting element and the first track.

Figure 4A:
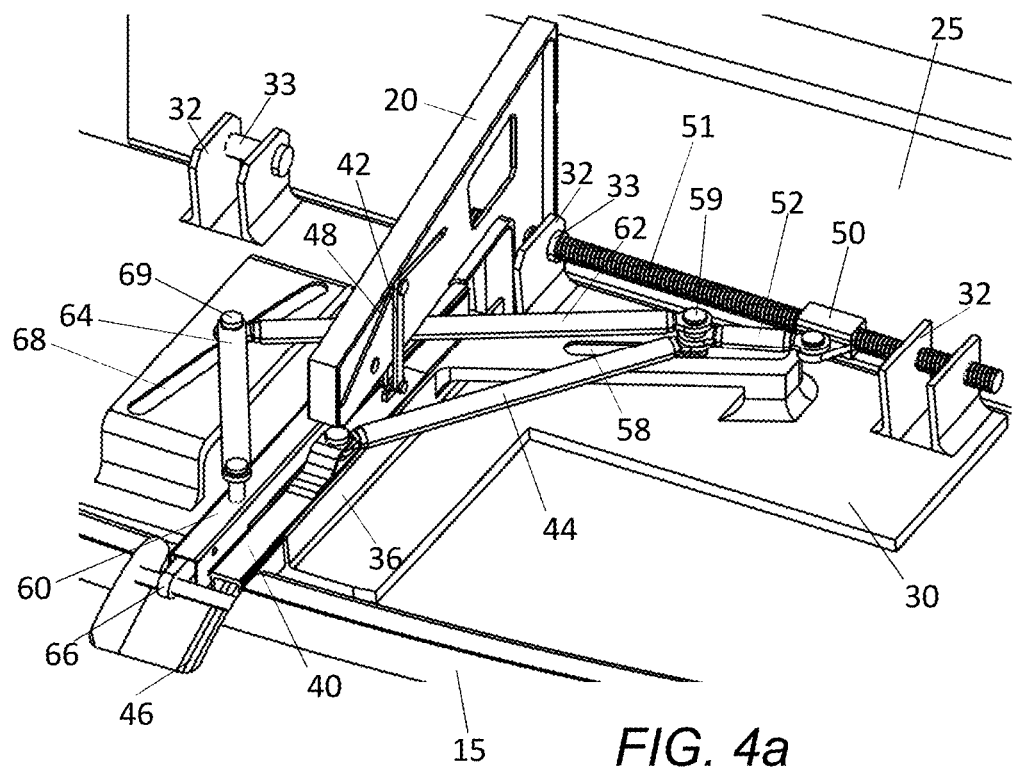
FIG. 4a shows a perspective view of the control surface actuation mechanism of FIGS. 3a-b in a deployed second state.
Figure 4B:
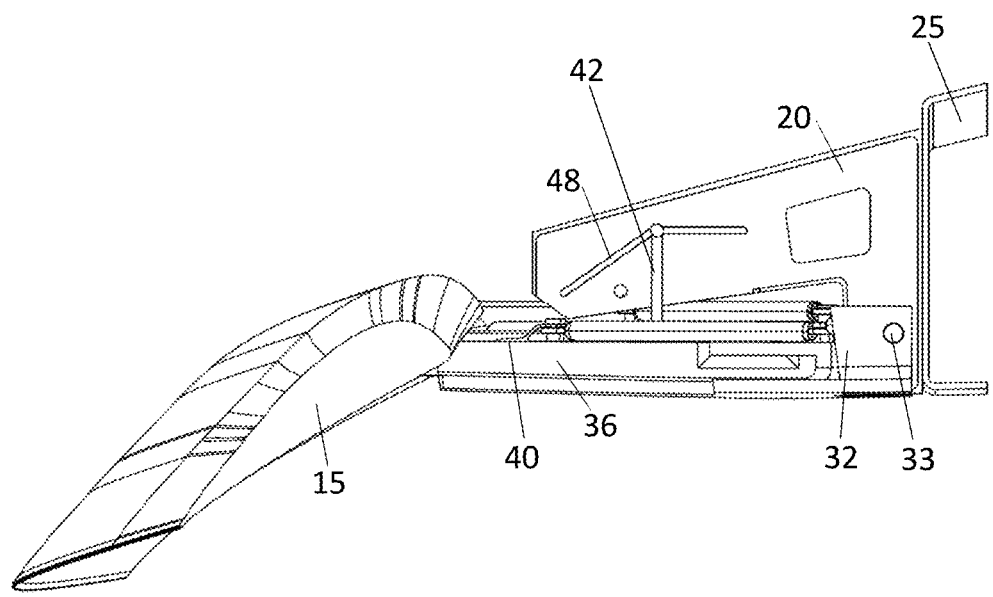
FIG. 4b shows a side view of the control surface actuation mechanism of FIGS. 3a-b in a deployed second state.

The control surface 15 in FIGS. 4a-b is shown in a deployed state (or second state) in which the control surface has rotated approximately 15 degrees with respect to the non-deployed (retracted) state shown in FIGS. 3a-b. The control surface has been rotated by the different respective translations of the two sliding members 40, 60, and also translated aft by translation of the first sliding member 40.

Figure 5A:
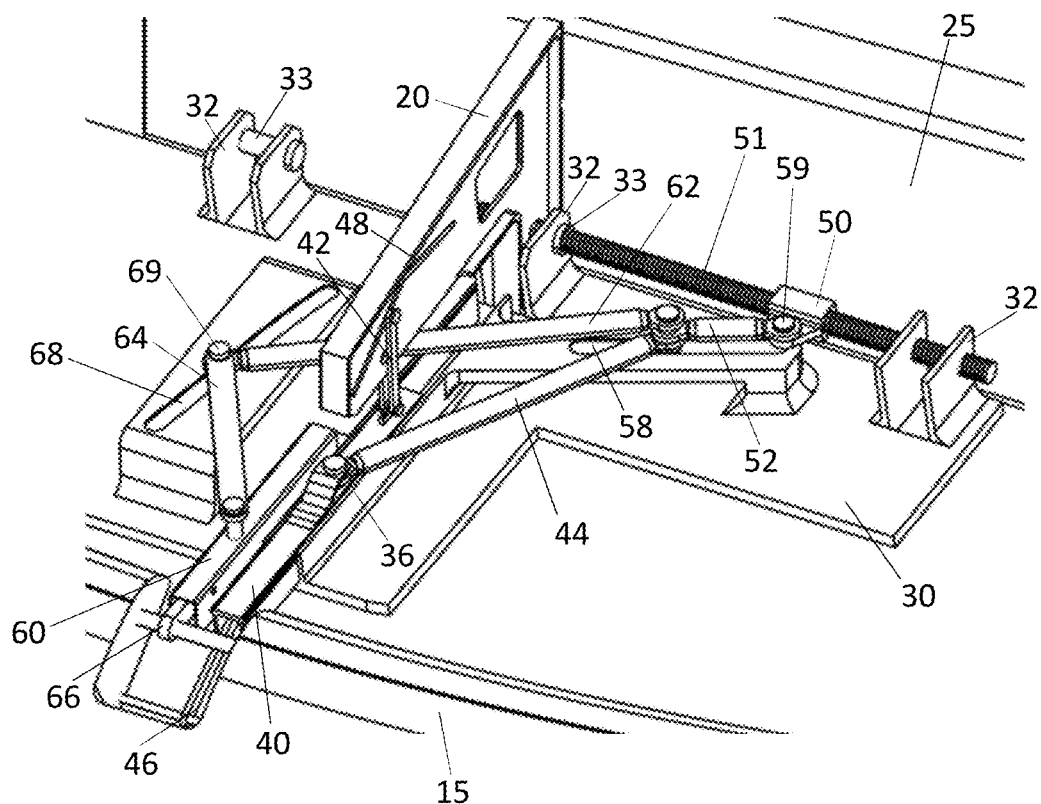
FIG. 5a shows a perspective view of the control surface actuation mechanism of FIGS. 3a-b in a deployed third state.
Figure 5B:
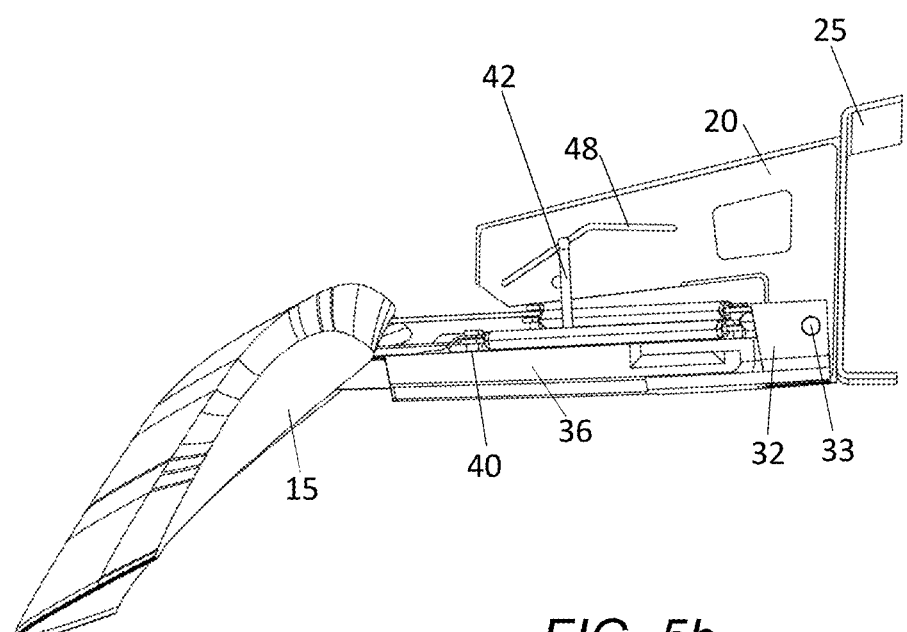
FIG. 5b shows a side view of the control surface actuation mechanism of FIGS. 3a-b in a deployed third state.

FIGS. 5a-b show the control surface in a third state rotated approximately 27 degrees with respect to the non-deployed (retracted) state shown in FIGS. 3a-b, and rotated 12 degrees with respect to second state shown in FIGS. 4a-b.

The actuator 50 in FIGS. 5a-b is shown at a third position along the drive shaft 51. The actuation mechanism operates substantially the same when the actuator 50 travels between the second and third positions as that previously described in relation to movement of the actuator 50 between the first and second positions, except that the portion of the first track travelled by the first end of the first connecting element 42 includes a non-linear portion.

As the first sliding member 40 translates along the channel 36, the first end of the first rigid connecting element 42 moves along a non-linear section of the track 48 so that the path of the track 48 changes direction. As a result of the shape of the track 48, the distance between the first track 48 and the first sliding member 40 decreases. However, the first rigid connecting element 42 that connects between the first sliding member 40 and the first track 48 has a fixed length, and so the distance between the first sliding member 40 and the position of the first end of the first rigid connecting element 42 is maintained. This causes a reactive force to be created against the first track 48 that presses against the first sliding member 40 and rotates the articulating support 30 about its spanwise pivot axis.

The coupling of the articulating support 30 to the control surface 15, through the sliding member 40, causes a reciprocal rotation of the control surface 15 in response to the rotation of the articulating support 30. This means that the first sliding member 40 provides translation to the control surface 15 by sliding with respect to the articulating support 30, and the rotation of the articulating support 30 provides rotation of the control surface 15. The rotation of the articulating support 30 is controlled by the path of the first track 48. Additional rotation of the control surface 15 can be provided by the second sliding member 60 sliding relative to the first sliding member 40.

The actuation mechanism is therefore able to control translation and/or rotation of a control surface 15 using a single actuator 50 without extensive use of cams and cam systems, so that manufacturing lead times, weight, and volume can all be decreased.

The flap track fairings traditionally associated with flap actuation mechanisms can be significantly reduced in size or even eliminated by employing the above described actuation mechanism, such as that shown in FIGS. 3-5. In this case the articulating support may provide part of an outer aerodynamic surface of the wing.

The path of the first track 48 is shown with two substantially linear regions either side of a non-linear portion that provide translation and rotation of the control surface 15. The path of the track 48 may provide more non-linear regions so that substantially all the path is non-linear, or may provide no non-linear regions so that the path is substantially linear. The path of the track 48 may be changed to provide pure translation, or pure rotation, or a combination of translation and rotation at different phases/states of the control surface deployment. The path of the track 48 is shown to provide a positive camber change to the aerofoil section of the wing 2, 3 due to the downward deflection/rotation of the control surface. Alternatively the path of the track 48 may be adapted to provide negative camber through an upward deflection/rotation of the control surface 15.

The second and third tracks 48, 68 are shown to have linear paths. Alternatively they may have non-linear paths to control the movement of the respective connecting elements they are attached to. For instance, the third track 68 may have a non-linear path that can increase or decrease the translation of the second sliding member 60 relative to the first sliding member so that the rate of rotation of the control surface 15 is increased or decreased.

The first track 48 on the aft rib 20 can alternatively be a through-slot in the aft rib 20 so that the first rigid connecting element 42 can connect from either side of the aft rib 20, or through both sides. The track 48 may alternatively be positioned on any other suitable part of the fixed aerofoil section or fixed support structure.

The sliding members 40, 60 are guided by channels 36, however the sliding members may be guided by any suitable alternative. For instance, the first sliding member 40 may instead be guided by the first rigid connecting element 42 via the first track 48.

It will be understood that the pivot joint on the articulating support 30 might be any suitable mechanism to provide rotation from the fixed aerofoil section about a generally spanwise axis. For instance, the pivot joint might be a butt hinge that connects between the articulating support 30 and the rear spar 25.

The actuation mechanism might not include a second sliding member 60 that slides independently from the first sliding member 40, so that rotation and/or translation of the control surface 15 is provided only by the respective movement of the first sliding member 40 and the rotation of the articulating support 30. Alternatively, further rotation might be provided by telescoping of one of the first or second control links 46, 66.

The actuator 50 is shown to be a linear actuator. Alternatively the mechanism can be adapted to use a rotary actuator, chain actuator, or other similar type of actuator known to the skilled person. The actuator 50 may be powered by any suitable means, such as by hydraulic, pneumatic or electric power.

In some embodiments, the sliding members 40, 60 may not be driven by the actuator through second and third tracks 58, 68. Alternatively they may be driven directly by one or more actuators 50.

Where the word 'or' appears this is to be construed to mean 'and/or' such that items referred to are not necessarily mutually exclusive and may be used in any appropriate combination.

Although the invention has been described above with reference to one or more preferred embodiments, it will be appreciated that various changes or modifications may be made without departing from the scope of the invention as defined in the appended claims.

The invention claimed is:

1. A control surface actuation mechanism for moving a control surface relative to a fixed aerofoil portion of an aircraft, comprising:
    an articulating support for pivotal coupling to the fixed aerofoil portion about a generally spanwise pivot axis,
    a sliding member having a proximal end mounted on the articulating support, and having a distal end for coupling to the control surface, the sliding member arranged to slide relative to the articulating support along a generally chordwise axis,
    a first track for attachment on the fixed aerofoil portion and defining a first path, and
    a first rigid connecting element connected at a first end to the first track and connected at a second end to a fixed point on the sliding member,
    wherein the first end of the first rigid connecting element is configured to move passively along the first path, as the sliding member is driven to slide relative to the articulating support by an actuator.

2. The control surface actuation mechanism according to claim 1, wherein the first rigid connecting element is pivotally connected at the first end to the first track.

3. The control surface actuation mechanism according to claim 1, wherein the first rigid connecting element is pivotally connected at the second end to the sliding member.

4. The control surface actuation mechanism according to claim 1, wherein the first path has a non-linear portion.

5. The control surface actuation mechanism according to claim 1, wherein the articulating support is configured to rotate about the spanwise pivot axis in response to movement of the first end of the first rigid connecting element along the first track.

6. The control surface actuation mechanism according to claim 1, wherein the control surface translates relative to the articulating support as the slider translates.

7. The control surface actuation mechanism according to claim 1, including a second rigid connecting element connected at a first end to the sliding member and connected at a second end to a second track defining a second path, wherein the second end of the second rigid connecting element is configured to move along the second path.

8. The control surface actuation mechanism according to claim 7, including a third rigid connecting element, wherein the third rigid connecting element causes rotation of the control surface with respect to the articulating support, and wherein a second end of the third rigid connecting element is coincident with the second end of the second rigid connecting element.

9. The control surface actuation mechanism according to claim 1, including a third rigid connecting element having a first end connected to the actuator via a rigid actuator link, wherein, wherein the third rigid connecting element causes rotation of the control surface with respect to the articulating support.

10. The control surface actuation mechanism according to claim 9, wherein the third rigid connecting element is connected to a third track that defines a third path.

11. The control surface actuation mechanism according to claim 9, wherein a first end of the third rigid connecting element is configured to move a second sliding member having a proximal end mounted on the articulating support, and having a distal end for coupling to the control surface, the second sliding member arranged to slide relative to the articulating support along a generally chordwise axis.

12. An aerofoil of an aircraft, including a fixed aerofoil portion, a control surface, and the control surface actuation mechanism according to claim 1.

13. The aerofoil an aircraft according to claim 12, wherein the articulating support comprises an aerodynamic outer surface of the aerofoil.

14. The aerofoil of an aircraft according to claim 12, wherein the fixed aerofoil portion has a rear spar and an aft rib, and the first track is on the aft rib.

15. The aerofoil of an aircraft according to claim 14, wherein the actuator is a linear actuator that moves parallel to the rear spar.

\* \* \* \* \*